(12) United States Patent
Spiegel et al.

(10) Patent No.: US 11,111,388 B2
(45) Date of Patent: *Sep. 7, 2021

(54) PRECIPITATED CALCIUM CARBONATE WITH IMPROVED RESISTANCE TO STRUCTURAL BREAKDOWN

(71) Applicant: Omya International AG, Oftringen (CH)

(72) Inventors: Holger Spiegel, Villach (AT); Wolfgang Kreuger, Feistritz/Rosental (AT); Mathieu Skrzypczak, Terrace Park, OH (US); Joe Wenk, Kingsport, TN (US); Michael Dalton, Muttenz (CH); Aaro Salonen, Arlesheim (CH); Marc Maurer, Village-Neuf (FR); Patrick A. C. Gane, Rothrist (CH); Catherine Jean Ridgway, Mühlethal (CH)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,801

(22) Filed: Apr. 30, 2020

(65) Prior Publication Data

US 2020/0270462 A1 Aug. 27, 2020

Related U.S. Application Data

(63) Continuation of application No. 15/744,187, filed as application No. PCT/EP2016/068188 on Jul. 29, 2016, now Pat. No. 10,676,620.

(60) Provisional application No. 62/274,873, filed on Jan. 5, 2016.

(30) Foreign Application Priority Data

Jul. 31, 2015 (EP) ..................................... 15179382

(51) Int. Cl.
| | | |
|---|---|---|
| *C01F 11/18* | (2006.01) | |
| *B01J 10/00* | (2006.01) | |
| *B01F 3/04* | (2006.01) | |
| *D21H 19/38* | (2006.01) | |
| *D21H 21/18* | (2006.01) | |
| *C09C 1/02* | (2006.01) | |

(52) U.S. Cl.
CPC .......... *C09C 1/021* (2013.01); *B01F 3/04241* (2013.01); *B01J 10/00* (2013.01); *C01F 11/181* (2013.01); *C01F 11/182* (2013.01); *C01F 11/183* (2013.01); *C01P 2004/51* (2013.01); *C01P 2004/61* (2013.01); *C01P 2006/12* (2013.01)

(58) Field of Classification Search
None
See application file for complete search history.

(56) References Cited

U.S. PATENT DOCUMENTS

| 5,811,070 | A | 9/1998 | You |
| 10,676,620 | B2 * | 6/2020 | Spiegel ................. C01F 11/182 |
| 2004/0092639 | A1 | 5/2004 | Kasahara et al. |
| 2007/0169905 | A1 | 7/2007 | Yamashita et al. |

FOREIGN PATENT DOCUMENTS

| CN | 103911197 A | 7/2014 |
| EP | 0 407 180 A2 | 1/1991 |
| EP | 2 194 103 A1 | 6/2010 |
| EP | 2 371 766 A1 | 10/2011 |
| EP | 2 447 213 A1 | 5/2012 |
| EP | 2 524 898 A1 | 11/2012 |
| EP | 2 939 980 A1 | 11/2015 |
| EP | 3 012 223 A1 | 4/2016 |
| EP | 3 124 436 A1 | 2/2017 |
| GN | 202657975 A | 1/2013 |
| GN | 104016391 A | 9/2014 |
| WO | 2010/018432 A1 | 2/2010 |
| WO | 2011/121065 A1 | 10/2011 |
| WO | 2013/142473 A1 | 9/2013 |
| WO | 2014/060286 A1 | 4/2014 |
| WO | 2014/128087 A1 | 8/2014 |

OTHER PUBLICATIONS

Office Action dated Jan. 21, 2019 from Chinese Application No. 201680044915.X.
Search Report dated Oct. 26, 2015 from European Application No. 15179382.5.
Office Action dated Jan. 22, 2019 from Japanese Application No. 2018-504839.
Office Action dated May 11, 2018 from Korean Application No. 10-2017-7011322.
Search Report dated Nov. 15, 2018 from Russian Application No. 2018107083.
Office Action dated Dec. 15, 2016 from Taiwanese Application No. 105123216.
International Preliminary Report on Patentability dated Feb. 15, 2018 from International Application No. PCT/EP2016/068188.
International Search Report dated Sep. 26, 2016 for PCT/EP2016/068188.
The Written Opinion of the International Searching Authority dated Sep. 26, 2016 for PCT/EP2016/068188.

\* cited by examiner

*Primary Examiner* — Daniel Berns
(74) *Attorney, Agent, or Firm* — Fay Sharpe LLP

(57) ABSTRACT

The present invention is directed to a process for producing precipitated calcium carbonate with improved resistance to structural breakdown, wherein the milk of lime is carbonated in the presence of at least one gas other than carbon dioxide, or the carbonation is carried out in the presence of a static gas bubble comminution unit as well as to precipitated calcium carbonate obtained by such a process.

21 Claims, No Drawings

PRECIPITATED CALCIUM CARBONATE WITH IMPROVED RESISTANCE TO STRUCTURAL BREAKDOWN

This application is a continuation of U.S. patent application Ser. No. 15/744,187, filed Jan. 12, 2018; which is a U.S. National Phase of PCT Application No. PCT/EP2016/068188, filed Jul. 29, 2016; which claims priority to U.S. Provisional Application No. 62/274,873, filed Jan. 5, 2016 and European Application No. 15179382.5, filed Jul. 31, 2015.

The present invention relates to a process and a carbonation system for producing precipitated calcium carbonate with improved resistance to structural breakdown, especially improved resistance to compression, and precipitated calcium carbonate obtained by such a process as well as its use. Furthermore, the present invention relates to a carbonation system.

In the recent years calcium carbonate has found a wide array of uses across many fields. For example, calcium carbonate is one of the most widely used minerals in the paper, plastic, paint and coating industries both as a filler and, due to its white colour, as a coating pigment. In the paper industry calcium carbonate is valued for its high brightness, opacity and gloss and is commonly used as a filler to make bright opaque paper. In addition, calcium carbonate is frequently used as an extender in paints and is also used as a filler in adhesives, sealants and plastics. High grade calcium carbonate has also found uses in formulations of pharmaceuticals.

Calcium carbonate is known to exist as natural occurring minerals as well as synthetically produced products. Ground calcium carbonate (GCC) is a calcium carbonate obtained from natural sources and processed through a wet and/or dry treatment step. Precipitated calcium carbonate (PCC) is a synthesized material obtained from a precipitation reaction. While naturally occurring ground calcium carbonate (GCC) is usually used as a filler in many applications, synthetically manufactured precipitated calcium carbonate (PCC) may be tailor-made, for example with respect to its morphology and particle size, allowing PCC to fulfil additional functions.

Generally, one way to produce calcium carbonate commercially is by calcining crude limestone to obtain quicklime. Water is then added to yield an aqueous suspension of calcium hydroxide ("milk of lime") (this reaction is shown in reaction (1)), and carbon dioxide is reintroduced into this slurry to precipitate the calcium carbonate (this reaction is shown in reaction (2)).

$$CaO + H_2O \rightarrow Ca(OH)_2 + \text{heat} \quad (1)$$

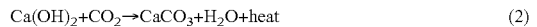

$$Ca(OH)_2 + CO_2 \rightarrow CaCO_3 + H_2O + \text{heat} \quad (2)$$

The product of this process is known as precipitated calcium carbonate ("PCC"). The resulting aqueous suspension, or slurry, of calcium carbonate may be used as it is or further processed (e.g., dewatered, grinded, etc.) to form a dry product. Depending on the exact reaction conditions the precipitation reaction is capable of producing calcium carbonate with different characteristics.

WO 2011/121065 A1 discloses a process for preparing PCC comprising inter alia the step of preparing an aqueous suspension of PCC seeds by carbonating a suspension of calcium hydroxide in the presence of strontium hydroxide.

WO 2013/142473 A1 relates to a process comprising the steps of slaking quick lime to obtain slaked lime, and subjecting the slaked lime, without agitation, without prior cooling in a heat exchanger, and in the absence of any additives, to carbonation with carbon dioxide gas to produce PCC.

U.S. Pat. No. 5,811,070 A discloses a process for producing calcium carbonate particles having an average size of 0.1 to 1.0 µm, the process comprising the steps of introducing carbon dioxide into a milk of lime containing a first reagent to prepare an aqueous suspension containing calcium carbonate particles of 0.4 µm in average size, adding a milk of lime into the aqueous suspension, and continuously reacting a carbonated solution containing a second reagent with the aqueous suspension.

However, there is a continuous need for processes providing precipitated calcium carbonate, and especially for processes that allow the control of certain structural properties of the produced precipitated calcium carbonate. Furthermore, there is a continuous need for providing precipitated calcium carbonate with specific or tailor-made characteristics.

Accordingly, it is an object of the present invention to provide a process for producing precipitated calcium carbonate with improved mechanical properties. In particular, it is an object of the present invention to provide a process for producing precipitated calcium carbonate with improved resistance to structural breakdown, especially with improved resistance to compression. It is also desirably that the process does not affect the kinetics of the carbonation step in a negative way and/or does not impair the crystallographic and/or morphological structure of the PCC.

Furthermore, it is an object of the present invention to provide precipitated calcium carbonate that has improved mechanical properties and particularly shows improved resistance to structural breakdown, especially improved resistance to compression. In particular, it is an object of the present invention to provide precipitated calcium carbonate that shows a stronger resistance of the precipitated calcium carbonate clusters/crystals to structural breakdown or distortion during processing (i.e. lesser tendency to form discrete precipitated calcium carbonate particles) than conventional precipitated calcium carbonate, and improves the mechanical properties such as stiffness of products in which it is used, for example, in papers.

The foregoing and other objects are solved by the subject-matter as defined herein in the independent claims.

According to one aspect of the present invention a process for producing precipitated calcium carbonate according to the present invention is provided comprising the steps of:
a) providing a calcium oxide containing material,
b) providing an aqueous solution,
c) providing a gas comprising carbon dioxide,
d) preparing a milk of lime comprising $Ca(OH)_2$ by mixing the aqueous solution of step b) with the calcium oxide containing material of step a),
e) carbonating the milk of lime obtained from step d) with the gas of step c) to form an aqueous suspension of precipitated calcium carbonate, wherein
  i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or
  ii) the carbonation is carried out in the presence of a static gas bubble comminution unit that is located in the milk of lime and the gas of step c) is flushed around and/or through the static gas bubble comminution unit.

According to a further aspect of the present invention precipitated calcium carbonate obtained by the process of the present invention is provided.

According to another aspect of the present invention surface-coated precipitated calcium carbonate obtained by the process of the present invention is provided.

According to still a further aspect of the present invention a carbonation system for producing a precipitated calcium carbonate according to the present invention is provided, comprising A) a containment for milk of lime,
B) at least one inlet for gas, wherein the at least one inlet is arranged such that it is covered with the milk of lime, and
C) a static gas bubble comminution unit, wherein the static gas bubble comminution unit is arranged in the containment such that it is located in the milk of lime, wherein the at least one inlet of gas and the static gas bubble comminution unit are aligned to each other such that the gas provided by the at least one inlet for gas is flushed around and/or through the static gas bubble comminution unit.

According to still a further aspect of the present invention the use of the precipitated calcium carbonate obtained by the process of the present invention or the surface-coated precipitated calcium carbonate obtained by the process of the present invention in paper, paper products, paper coatings, ink, paint, coating, plastics, polymer compositions, adhesives, building products, foodstuff, agricultural products, cosmetic products or pharmaceutical products, preferably in paper, more preferably in paper coatings and most preferably in uncoated woodfree paper is provided.

Advantage embodiments of the present invention are defined in the corresponding sub-claims.

According to one embodiment the process further comprises the steps of f) separating the precipitated calcium carbonate from the aqueous suspension obtained from step e), and optionally
g) drying the separated precipitated calcium carbonate obtained from step f).

According to one embodiment the aqueous solution of step b) consists only of water.

According to one embodiment the aqueous solution of step b) comprises further additives selected from the group consisting of water soluble polymers, calcium carbonate nanoparticles, water-soluble calcium salts, slaking additives, and mixtures thereof.

According to one embodiment the calcium oxide containing material of step a) and the aqueous solution of step b) are mixed in a mass ratio from 1:1 to 1:15, preferably in a mass ratio from 1:4 to 1:12.

According to one embodiment the gas of step c) comprises between 4 and 99 vol.-% carbon dioxide, more preferably between 5 and 95 vol.-% carbon dioxide, even more preferably between 6 and 40 vol.-% carbon dioxide, even more preferably between 7 and 30 vol.-% carbon dioxide and most preferably between 8 and 25 vol.-% carbon dioxide, based on the total volume of the gas.

According to one embodiment the gas in step e) i) is introduced at a rate of 0.06 to 5.00 kg gas/h per kg of dry $Ca(OH)_2$, preferably at a rate of 0.09 to 4.00 kg gas/h per kg of dry $Ca(OH)_2$, and most preferably at a rate of 0.12 to 3.00 kg gas/h per kg of dry $Ca(OH)_2$ and/or the carbon dioxide is introduced at a rate of 0.05 to 3.50 kg $CO_2$/h per kg of dry $Ca(OH)_2$, preferably at a rate of 0.07 to 2.00 kg $CO_2$/h per kg of dry $Ca(OH)_2$, and most preferably at a rate of 0.10 to 1.50 kg $CO_2$/h per kg of dry $Ca(OH)_2$.

According to one embodiment the precipitated calcium carbonate obtained in step e) has a specific surface area from 2.0 to 80.0 $m^2/g$ preferably from 2.5 to 13.0 $m^2/g$, more preferably from 3.0 to 12.0 $m^2/g$, and most preferably from 3.5 to 10.0 $m^2/g$, measured using nitrogen and the BET method according to ISO 9277:1995.

According to one embodiment the precipitated calcium carbonate obtained in step e) is in form of particles having a weight median particle size $d_{50}$ of between 1.0 and 9.0 µm, preferably of between 1.2 and 3.7 µm, more preferably of between 1.6 and 3.5 µm, even more preferably of between 1.8 and 3.0 µm and most preferably of between 2.0 and 2.6 µm.

According to one embodiment the precipitated calcium carbonate obtained in step e) is in the form of particles having a crystal form selected from the group consisting of an aragonitic, vateritic, calcitic crystal form and mixtures thereof, and preferably the crystal form of the precipitated calcium carbonate particles is calcitic.

According to one embodiment the milk of lime is stirred during step e).

According to one embodiment the process further comprises a step h) of contacting at least a part of the surface of the precipitated calcium carbonate, preferably the precipitated calcium carbonate obtained from step g) with a surface-treatment agent.

According to one embodiment the precipitated calcium carbonate obtained by the process of the present invention has a friability value that is at least 2% lower than the friability value of precipitated calcium carbonate that has been obtained by the same process of the present invention but differs from that process in that the flow of the gas in the carbonation step is not introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or in that the carbonation is carried out without a static gas bubble comminution unit that is located in the milk of lime.

It should be understood that for the purpose of the present invention, the following terms have the following meaning:

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP 2 447 213 A1, EP 2 524 898 A1, EP 2 371 766 A1, or WO 2013/142473 A1.

A "calcium oxide containing material" in the meaning of the present invention can be a mineral or a synthetic material having a content of calcium oxide of at least 50 wt.-%, preferably 75 wt.-%, more preferably 90 wt.-%, and most preferably 95 wt.-%, based on the total weight of the calcium oxide containing material. For the purpose of the present invention, a "mineral material" is a solid substance having a definite inorganic chemical composition and characteristic crystalline and/or amorphous structure.

Throughout the present document, the "particle size" of precipitated calcium carbonate, or other particulate materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are smaller than this particle size. For the purpose of the present invention the particle size is specified as weight median particle size $d_{50}$ unless indicated otherwise. For determining the weight median particle size $d_{50}$ value or the top cut particle size $d_{98}$ value or the particle size $d_{75}$ value or the particle size $d_{25}$ value of particles in the range of 0.2 to 100 µm a Sedigraph 5100 or 5120 device from the company Micromeritics, USA, can be used.

The "steepness factor" $d_{75/25}$ according to the present invention is defined as the quotient of the $d_{75}$ and the $d_{25}$ value.

The "friability value" in the meaning of the present invention is a measure of the resistance to structural breakdown of the obtained precipitated calcium carbonate. Especially it is a measure of the resistance to compression of the obtained precipitated calcium carbonate. If $y=a-b \cdot \ln x$ is the fitting equation of the compaction pressure versus the pore diameter corresponding to the peak of the first derivative of the cumulative intrusion curve obtained from mercury intrusion measurements of the obtained precipitated calcium carbonate, and $y=c+d \cdot \ln x$ is the fitting equation of the compaction pressure versus the normalised specific pore volume difference of the obtained precipitated calcium carbonate at an initial pressure of 60 MPa in relation to pressures higher than 60 MPa, then the "friability value" in the meaning of the present invention is defined as the product of b and d, wherein the constant b is the gradient of the logarithmic part of the fitting equation $y=a-b \cdot \ln x$ and wherein the constant d is the gradient of the logarithmic part of the fitting equation $y=c+d \cdot \ln x$.

The "compaction pressure" in the meaning of the present invention is the pressure at which the obtained precipitated calcium carbonate is pressed mechanically into tablets. For tablet formation a manually operated hydraulic press, for example, a Herzog TP 40/2D from Herzog Maschinenfabrik GmbH & Co., Osnabruck, Germany, may be used.

A "specific BET surface area" (SSA) in the meaning of the present invention is defined as the surface area of the precipitated calcium carbonate particles divided by the mass of PCC particles. As used therein the specific surface area is measured by nitrogen adsorption using the BET isotherm (ISO 9277:1995) and is specified in $m^2/g$.

In the context of the present invention, the term "pore" is to be understood as describing the space that is found between particles, i.e. that is formed by the particles as they pack together under nearest neighbour contact (interparticle pores), such as in a powder or a compact.

The "interparticle intruded specific pore volume" according to the present invention can be calculated from a mercury intrusion porosimetry measurement and describes the measured pore volume that is found between the pigment particles per unit mass of sample containing the particles. The intruded total specific void volume represents the sum of all the individual pore volumes, which can be intruded by mercury, per unit mass of the sample and can be measured by mercury porosimetry using a Micrometrics Autopore IV or V mercury porosimeter. An exemplary mercury porosimetry experiment entails the evacuation of a porous sample to remove trapped gases, after which the sample is surrounded with mercury. The amount of mercury displaced by the sample allows calculation of the sample's bulk volume, $V_{bulk}$. Pressure is then applied to the mercury so that it intrudes into the sample through pores connected to the external surface. The maximum applied pressure of mercury can be 414 MPa, equivalent to a Laplace throat diameter of 0.004 µm. The data can be corrected using Pore-Comp (Gane et al. "Void Space Structure of Compressible Polymer Spheres and Consolidated Calcium Carbonate Paper-Coating Formulations", Industrial and Engineering Chemistry Research 1996, 35 (5):1753-1764) for mercury and penetrometer effects, and also for sample compression. The intruded total specific void volume corresponds to the void volume intruded by mercury per unit mass of the sample determined by mercury porosimetry. By taking the first derivative of the cumulative intrusion curves the pore size distributions based on equivalent Laplace diameter assuming a mercury-solid surface contact angle of 140° and mercury surface tension of 480 dyn·cm$^{-1}$, inevitably including the effect of pore-shielding when present, are revealed.

The term "brightness" as used in the context of the present invention is a measurement of the percentage of diffuse light reflected from a paper's surface or a powder tablet produced from a pigment. A brighter sheet or pigment reflects more diffuse light. As used herein, brightness of the paper or pigment may be measured at a wavelength of light of 457 nm (R457) and is specified in percent.

For the purpose of the present invention, the "solids content" of a liquid composition is a measure of the amount of material remaining after all the solvent or water has been evaporated.

For the purpose of the present invention, an "aqueous solution" is a solution that comprises water.

A "suspension" or "slurry" in the meaning of the present invention comprises undissolved solids and water, and optionally further additives, and usually contains large amounts of solids and, thus, is more viscous and can be of higher density than the liquid from which it is formed.

For the purpose of the present invention, the term "viscosity" or "Brookfield viscosity" refers to Brookfield viscosity. The Brookfield viscosity is for this purpose measured by a Brookfield DV-II+ Pro viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

Unless specified otherwise, the term "drying" refers to a process according to which at least a portion of water is removed from a material to be dried such that a constant weight of the obtained "dried" material at 120° C. is reached. Moreover, a "dried" material may be further defined by its total moisture content which, unless specified otherwise, is less than or equal to 3.0 wt.-%, preferably less than or equal to 0.5 wt.-%, more preferably less than or equal to 0.2 wt.-%, and most preferably between 0.03 and 0.07 wt.-%, based on the total weight of the dried material.

The "total moisture content" of a material refers to the percentage of moisture (i.e. water) which may be desorbed from a sample upon heating to 220° C.

A "static gas bubble comminution unit" is a structural element of an apparatus or a device or a containment, which is used to carry out the process of the present invention. According to one embodiment of the present invention the static gas bubble comminution unit is located in the apparatus or device or containment such that the gas can be flushed around and/or through the static gas bubble comminution unit. For example, the static gas bubble comminution unit may comprise a fluid-permeable structure that permits fluids and gas to diffuse through this structure. The static gas bubble comminution unit consists of material(s) that do(es) not react with milk of lime or carbon dioxide. According to the present invention "static" means that the gas bubble comminution unit neither moves actively in the milk of lime nor is driven from an external power source. According to the present invention "gas bubble comminution" unit means that the unit may split up the gas flow in individual gas bubbles. In a preferred embodiment the obtained gas bubbles are nanobubbles and/or microbubbles and/or macrobubbles, i.e. bubbles having a diameter in the nanometre and/or micrometre and/or millimetre range.

Where the term "comprising" is used in the present description and claims, it does not exclude other elements. For the purposes of the present invention, the term "consisting of" is considered to be a preferred embodiment of the term "comprising of". If, hereinafter, a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present invention process for producing precipitated calcium carbonate is provided comprising the steps of a) providing a calcium oxide containing material, b) providing an aqueous solution, c) providing a gas comprising carbon dioxide, d) preparing a milk of lime comprising $Ca(OH)_2$ by mixing the aqueous solution of step b) with the calcium oxide containing material of step a), and e) carbonating the milk of lime obtained from step d) with the gas of step c) to form an aqueous suspension of precipitated calcium carbonate, wherein i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or ii) the carbonation is carried out in the presence of a static gas bubble comminution unit that is located in the milk of lime and the gas of step c) is flushed around and/or through the static gas bubble comminution unit. Furthermore, precipitated calcium carbonate obtained by such a process is provided.

In the following details and preferred embodiments of the inventive product and process will be set out in more details. It is to be understood that these technical details and embodiments also apply to the inventive use of the products as well as to the inventive carbonation system.

Process Step a)

In step a) of the process of the present invention, a calcium oxide containing material is provided.

The calcium oxide containing material of step a) can be obtained by calcining a calcium carbonate containing material. Calcination is a thermal treatment process applied to calcium carbonate containing materials in order to bring about a thermal decomposition resulting in the formation of calcium oxide and gaseous carbon dioxide. Calcium carbonate containing materials which may be used in such a calcinations process are those selected from the group comprising precipitated calcium carbonates, natural calcium carbonate containing minerals such as marble, limestone and chalk, and mixed alkaline earth carbonate minerals comprising calcium carbonate such as dolomite, or calcium carbonate rich fractions from other sources. It is also possible to subject a calcium carbonate containing waste material to a calcination process in order to obtain a calcium oxide containing material.

Calcium carbonate decomposes at about 1 000° C. to calcium oxide (commonly known as quicklime). The calcination step may be carried out under conditions and using equipment well-known to the person skilled in the art. Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content, e.g. by X-ray diffraction, or the slaking reactivity by common methods.

According to one embodiment of the present invention, the calcium oxide containing material of step a) is obtained by calcining a calcium carbonate containing material, preferably selected from the group consisting of precipitated calcium carbonate, natural calcium carbonate minerals such as marble, limestone and chalk, mixed alkaline earth carbonate minerals comprising calcium carbonate such as dolomite, and mixtures thereof.

For reasons of efficiency, it is preferred that the calcium oxide containing material has a minimum calcium oxide content of at least 75 wt.-%, preferably at least 90 wt.-%, and most preferably 95 wt.-%, based on the total weight of the calcium oxide containing material. According to one embodiment, the calcium oxide containing material consists of solely calcium oxide.

The calcium oxide containing material can consist of only one type of calcium oxide containing material. Alternatively, the calcium oxide containing material can consist of a mixture of two or more types of calcium oxide containing materials.

The calcium oxide containing material can be used in the inventive process in its original form, i.e. as a raw material, for example, in form of smaller and bigger chunks. For example, the chunks can have a size from 0.1 to 80 mm, and preferably from 5 to 60 mm. Alternatively, the calcium oxide containing material can be ground finer before use. According to one embodiment of the present invention, the calcium oxide containing material is in forms of particles having weight median particle size $d_{50}$ from 0.1 to 1 000 μm, and preferably from 1 to 500 μm.

Process Step b)

In step b) of the process of the present invention, an aqueous solution is provided.

An aqueous solution according to the present invention comprises water. According to a preferred embodiment of the present invention the aqueous solution of step b) consists only of water.

According to another embodiment of the present invention the aqueous solution comprises in addition to the water at least one other solvent that is different to water.

The at least one other solvent that is different to water may be any solvent that is liquid under standard ambient temperature and pressure (SATP), which is defined as 25° C. and 100 kPa (1 bar).

According to one embodiment the at least one solvent other than water is miscible with water. Solvents that are miscible with water are aprotic polar solvent like ketones, e.g. acetone, lactones like γ-butyrolactone, lactames like N-methyl-2-pyrrolidone, nitriles like acetonotrile, nitro compounds like nitromethane, tertiary carboxamides like dimethylformamide, urea derivates like N,N'-dimethylpropyleneurea (DMPU), sulphoxides like dimethylsulphoxide (DMSO), or protic solvents like alcohols, for example, methanol, ethanol, 2-propanol, tert-butanol, tert-amylalkohol, 1-propanol, 2-butanol, 2-methyl-1-propanol, 1-butanol and diacetonealcohol, primary and secondary amines like 2-aminoethanol and N-methylethanolamine, primary and secondary amides like formamide, and mineral acids like sulphuric acid.

According to a preferred embodiment the aqueous solution comprises water and at least one solvent other than water selected from the group consisting of methanol, ethanol, 1-propanol, acetone and dimethylformamide. According to another embodiment of the present invention the aqueous solution comprises water and ethanol and preferably consists of water and ethanol.

The at least one other solvent than water may be provided in an total amount from 0.1 to 50 vol.-%, based on the total volume of the aqueous solution, preferably in an total amount from 1 to 30 vol.-%, more preferably from 2 to 20 vol.-%, and most preferably from 3 to 10 vol.-%.

According to one embodiment of the present invention the aqueous solution of step b) comprises further additives selected from the group consisting of water soluble polymers, calcium carbonate nanoparticles, water-soluble calcium salts, slaking additives, and mixtures thereof.

Water-soluble polymers are polymers that can be dissolved in water. The water-soluble polymers can have an anionic or cationic overall charge, can be zwitterionic or neutral. The water-soluble polymers can be naturally available polymers or synthetic polymers that can be obtained by polymerization, for example, by methods of radical polymerisation in solution, in a direct or reverse emulsion, in suspension or precipitation in solvents, in the presence of catalytic systems and chain transfer agents, or again by methods of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates. The water-soluble polymers may have a molecular weight $M_w$ of below 100 000 g/mol, or below 50 000 g/mol, or below 10 000 g/mol. According to one embodiment the molecular weight $M_w$ of the water-soluble polymer is in the range from 200 to 6 500 g/mol. Water-soluble polymers and methods to produce them are known to the skilled person and are described, for example, in the unpublished European patent application EP 14 166 751.

Calcium carbonate nanoparticles are fine particles having a number based particle size distribution in the nanometre range. For example, the nanoparticles may have a number based median particle size $d_{50}$ of less than 150 nm in all three dimensions of the particle. For determining the number based median particle size $d_{50}$ value or the number based top cut particle size $d_{98}$ value of nanoparticles, a Malvern Zetasizer Nano ZS can be used. The calcium carbonate nanoparticles comprise calcium carbonate that may be a ground calcium carbonate, a precipitated calcium carbonate, or a mixture thereof. Calcium carbonate nanoparticles and methods to produce them are known to the skilled person and are described, for example, in the unpublished European patent application EP 14 190 261.

Water-soluble calcium salts can be anhydrous salts or hydrate salts. According to a preferred embodiment the water-soluble calcium salts are selected from the group consisting of calcium nitrate, calcium sulphate, calcium acetate, calcium benzoate, calcium bicarbonate, calcium bromate, calcium bromide, calcium chlorate, calcium chloride, calcium iodite, calcium nitrite, calcium perchlorate, calcium permanganate, hydrates thereof, and mixtures thereof. As used herein, a "hydrate" is an inorganic salt containing water molecules combined in a definite ratio as an integral part of the crystal. Depending on the number of water molecules per formula unit of salt, the hydrate may be designated as monohydrate, dihydrate, trihydrate, tetrahydrate, pentahydrate, hexahydrate, heptahydrate, octahydrate, nonahydrate, decahydrate, hemihydrate, etc.

Slaking additives may be used to control the size of the PCC particles and their crystal morphology without affecting the viscosity of the aqueous suspension. The slaking additives may be selected from the group consisting of organic acids, organic acid salts, sugar alcohols, monosaccharides, disaccharides, polysaccharides, gluconates, phosphonates, lignosulphonates, and mixtures thereof.

According to one embodiment of the present invention, the slaking additives are selected from the group consisting of sodium citrate, potassium citrate, calcium citrate, magnesium citrate, monosaccharides, disaccharides, polysaccharides, sucrose, sugar alcohols, meritol, citric acid, sorbitol, sodium salt of diethylene triamine pentaacetic acid, gluconates, phosphonates, sodium tartrate, sodium lignosulphonate, calcium lignosulphonate, and mixtures thereof. According to a preferred embodiment, the slaking additive(s) is/are sodium citrate and/or saccharose.

According to one embodiment of the present invention, the aqueous solution of step b) comprises only one further additive. For example, the aqueous solution comprises one slaking additive, preferably saccharose. Alternatively, the aqueous solution of step b) comprises a mixture of two or more types of further additives. For example, the aqueous solution comprises a mixture a slaking additive and a water-soluble calcium salt, preferably a mixture of saccharose and calcium chloride.

The further additive(s) may be provided in an total amount from 0.01 to 20 wt.-%, based on the total amount of calcium oxide containing material, preferably in an total amount from 0.05 to 10 wt.-%, more preferably from 0.06 to 0.1 wt.-%, and most preferably from 0.07 to 0.5 wt.-%.

The further additive(s) can be provided in form of a solution or as a dry material. According to one embodiment, the further additive(s) is/are provided in form of a solution.

According to another embodiment of the present invention, the further additive(s) is/are provided in form of an aqueous solution.

According to a preferred embodiment of the present invention the aqueous solution does not comprise further additives.

Process Step c)

In step c) of the process of the present invention a gas comprising carbon dioxide is provided.

In accordance with the present invention the carbon dioxide ($CO_2$) may be obtained from gaseous carbon dioxide, liquid carbon dioxide or solid carbon dioxide. For example, the carbon dioxide can be produced by reacting an alkali- and/or earth alkali carbonate with acid. Furthermore, the carbon dioxide can be produced by the combustion of organics, such as ethyl alcohol, wood and the like or by fermentation.

According to a preferred embodiment of the present invention the carbon dioxide is captured from the calcinations of the crushed calcium carbonate as described under step a). According to another embodiment of the present invention the carbon dioxide may be obtained from an external source, for example, a gas bottle comprising carbon dioxide, or from flue gas.

According to one embodiment the gas of step c) further comprises at least one gas other than carbon dioxide. The gas other than carbon dioxide may be a gas that is inert to carbonation, which means that said gas does not participate in the carbonation reaction of the carbon dioxide with the milk of lime. Furthermore, the gas other than carbon dioxide may be a gas that is gaseous under standard ambient temperature and pressure (SATP), which is defined as 25° C. and 100 kPa (1 bar). For example, the at least one gas other than carbon dioxide may be selected from the group consisting of methane, ethane, propane, butane, nitrogen, oxygen, helium, neon, argon, crypton, xenon, and mixtures thereof. According to one embodiment the at least one gas other than carbon dioxide may be methane, ethane, propane, butane, nitrogen, oxygen, helium, neon, argon, crypton, xenon, or mixtures thereof and may comprise hydrogen sulphide, sulphur dioxide and/or sulphur trioxide in small amounts, preferably below 1 vol.-%, based on the total volume of the gas. According to a preferred embodiment the at least one gas other than carbon dioxide consists only of methane, ethane, propane, butane, nitrogen, oxygen, helium, neon, argon, crypton, xenon, or mixtures thereof.

According to one embodiment of the present invention, the gas of step c) comprises carbon dioxide and only one gas other than carbon dioxide. For example, the gas of step c) may comprise carbon dioxide and nitrogen or oxygen and preferably carbon dioxide and nitrogen. According to a preferred embodiment of the present invention the gas of step c) consists of carbon dioxide and nitrogen or oxygen, and preferably consists of carbon dioxide and nitrogen.

Alternatively, the gas of step c) may comprise carbon dioxide and a mixture of two or more gases other than carbon dioxide. For example, the gas of step c) may comprise carbon dioxide and a mixture of nitrogen and oxygen. According to a preferred embodiment of the present invention the gas of step c) consists of carbon dioxide, nitrogen and oxygen.

The gas comprising carbon dioxide of step c) may also be air or technical air that may be enriched with carbon dioxide. Air is a naturally occurring mixture comprising primarily nitrogen (about 78.08 vol.-%) and oxygen (about 20.95 vol.-%) and, furthermore, argon (0.93 vol.-%), carbon dioxide (0.04 vol.-%) and traces of other gases. Technical air or synthetic air is a mixture of nitrogen and oxygen, preferably consisting of 79.5 vol.-% nitrogen and 20.5 vol.-% oxygen.

The gas of step c) comprising carbon dioxide may also be flue gas that is exhausted from industrial processes like combustion processes or calcination processes or alike. The gas of step c) comprising carbon dioxide may also be flue gas that is exhausted from boilers. The flue gas can be enriched with carbon dioxide or the flue gas can be mixed with carbon dioxide.

According to one embodiment of the present invention the gas of step c) comprises between 4 and 99 vol.-% carbon dioxide, more preferably between 5 and 95 vol.-% carbon dioxide, even more preferably between 6 and 40 vol.-% carbon dioxide, even more preferably between 7 and 30 vol.-% carbon dioxide, and most preferably between 8 and 25 vol.-% carbon dioxide, based on the total volume of the gas.

The gas of step c) may be prepared before the carbonation step e). For example, the gas of step c) may be prepared by mixing the carbon dioxide and the at least one gas other than carbon dioxide before step e). The gas of step c) may be used directly in step e) or stored before use in a containment, for example, in a tank. Alternatively the gas of step c) may be prepared during the carbonation step e). For example, the gas of step c) may be prepared during step e) by mixing the carbon dioxide and the at least one gas other than carbon dioxide in the milk of lime, by introducing both gases via different supply lines into the milk of lime.

Process Step d)

In step d) of the process of the present invention, a milk of lime comprising $Ca(OH)_2$ is prepared by mixing the aqueous solution of step b) with the calcium oxide containing material of step a).

The reaction of the calcium oxide containing material with aqueous solution results in the formation of a milky calcium hydroxide suspension, better known as milk of lime. Said reaction is highly exothermic and is also designated in the art as "lime slaking".

According to one embodiment of the present invention, the temperature of the aqueous solution, which is used in mixing step d), i.e. the temperature of the aqueous solution that is used to slake the calcium oxide containing material, is adjusted to be in the range from more than 0° C. and less than 100° C. In other words, the aqueous solution that is used to slake the calcium oxide containing material is adjusted to a temperature range, in which the water is in liquid form. Preferably, the temperature of the aqueous solution, which is employed in mixing step d) is adjusted to be from 1° C. to 70° C., more preferably from 2° C. to 50° C., even more preferably from 30° C. to 50° C., and most preferably from 35° C. to 45° C. It will be apparent to the skilled person that the initial temperature of the aqueous solution is not necessarily the same one as the temperature of the mixture prepared in step d) due to the highly exothermic slaking reaction and/or due to the mixing of substances having different temperatures.

According to one embodiment of the present invention, process step d) comprises the steps of:
d1) providing the aqueous solution of step b), and
d2) adding the calcium oxide containing material of step a) to the aqueous solution of step d1).

According to another embodiment of the present invention, process step d) comprises the steps of:
d3) providing the calcium oxide containing material of step a), and
d4) adding the aqueous solution of step b) to the calcium oxide containing material of step d3).

According to still another embodiment of the present invention, in process step d) the calcium oxide containing material of step a), and the aqueous solution of step b) are mixed simultaneously.

As described under step b) the aqueous solution of step b) comprises water, and optionally a least one further solvent and/or optionally further additives selected from the group consisting of water soluble polymers, calcium carbonate nanoparticles, water-soluble calcium salts, slaking additives, and mixtures thereof.

According to another embodiment of the present invention, process step d) comprises the steps of:

- d5) mixing the calcium oxide containing material of step a) with the water and optional the at least one further solvent of step b), and
- d6) adding the further additives selected from the group consisting of water soluble polymers, calcium carbonate nanoparticles, water-soluble calcium salts, slaking additives, and mixtures thereof to the mixture obtained in step d5).

The at least one further additive selected from the group consisting of water soluble polymers, calcium carbonate nanoparticles, water-soluble calcium salts, slaking additives, and mixtures thereof may be added in step d6) in one portion or in several portions, for example, in two, three, four, five, or more portions.

Process step d) may be performed at room temperature, i.e. at a temperature of 20° C.±2° C., or at an initial temperature of 30° C. to 60°, preferably 35° C. to 45° C. Since the slaking reaction is exothermic, the temperature typically raises to a temperature between 85° C. and 99° C. during step d), preferably to a temperature between 90° C. and 95° C. According to a preferred embodiment, process step d) is performed with mixing, agitation, or stirring, for example, mechanical stirring. Suitable process equipment for mixing, agitation or stirring is known to the skilled person.

The progress of the slaking reaction may be observed by measuring the temperature and/or conductivity of the reaction mixture. It can also be monitored by turbidity control. Alternatively or additionally, the progress of the slaking reaction can be inspected visually.

According to one embodiment the present invention, the calcium oxide containing material of step a) and the aqueous solution of step b) are mixed in a mass ratio from 1:1 to 1:15, preferably in a mass ration from 1:4 to 1:12.

According to one embodiment of the present invention, the milk of lime comprising $Ca(OH)_2$ obtained in step d) has a solids content from 5 to 35 wt.-%, based on the total weight of the milk of lime, preferably from 10 to 20 wt.-%, and most preferably from 10 to 15 wt.-%.

According to one embodiment of the present invention, the milk of lime comprising $Ca(OH)_2$ obtained in step d) has a Brookfield viscosity from 1 to 1 000 mPa·s at 25° C., more preferably from 5 and 800 mPa·s at 25° C., and most preferably from 10 and 600 mPa·s at 25° C. According to one embodiment, the Brookfield viscosity is measured at 100 rpm.

It is within the confines of the present invention that additional water may be introduced during the slaking reaction in order to control and/or maintain and/or achieve the desired solids content or Brookfield viscosity of the milk of lime. Process step d) can be carried out in form of a batch process, a semi-continuous or a continuous process. For example, the aqueous solution of step b) and the calcium oxide containing material of step a) are fed into a slaker and the reaction heat resulting from the exothermic slaking reaction may be dissipated and the obtained milk of lime may be discharged to the next process stage, for example, the carbonation stage or a screening stage.

Process Step e)

In step e) of the process of the present invention, the milk of lime obtained from step d) is carbonated with the gas of step c) to form an aqueous suspension of precipitated calcium carbonate, wherein i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or ii) the carbonation is carried out in the presence of a static gas bubble comminution unit that is located in the milk of lime and the gas of step c) is flushed around and/or through the static gas bubble comminution unit.

The carbonation as such is well-known by the person skilled in the art. The introduction of carbon dioxide into the milk of lime quickly results in the formation of the carbonate ion ($CO_3^{2-}$), and thus, the requisite concentration for calcium carbonate to be formed. Particularly, the carbonation reaction can be readily controlled considering the reactions involved in the carbonation process. Carbon dioxide dissolves according to its partial pressure forming carbonate ions via the formation of carbonic acid ($H_2CO_3$), which, in such an alkaline solution, dissociates to its constituent hydrogen and carbonate ions. Once the ionic product of calcium carbonate is sufficiently greater than the solubility product, calcium carbonate precipitates. At the same time, hydroxide ions are neutralized by the dissociated hydrogen ions. As a result the ionic product for calcium hydroxide would therefore be less than the solubility product, and it would continue to dissolve. This occurs continually, so long as $CO_2$ is bubbled into solution, until all calcium hydroxide is consumed, or is trapped in the calcium carbonate crystal structure.

According to one embodiment of the present invention in step e) the milk of lime obtained from step d) is carbonated with the gas of step c) to form an aqueous suspension of precipitated calcium carbonate, wherein the gas of step c) further comprises at least one gas other than carbon dioxide and the gas of step c) is introduced at a rate of 0.06 to 5.00 kg gas/h per kg of dry $Ca(OH)_2$, preferably at a rate of 0.09 to 4.00 kg gas/h per kg of dry $Ca(OH)_2$, and most preferably at a rate of 0.12 to 3.00 kg gas/h per kg of dry $Ca(OH)_2$ and/or the carbon dioxide is introduced at a rate of 0.05 to 3.50 kg $CO_2$/h per kg of dry $Ca(OH)_2$, preferably at a rate of of 0.07 to 2.00 kg $CO_2$/h per kg of dry $Ca(OH)_2$, and most preferably at a rate of 0.10 to 1.50 kg $CO_2$/h per kg of dry $Ca(OH)_2$.

According to one embodiment of the present invention in step e) the milk of lime obtained from step d) is carbonated with the gas of step c) to form an aqueous suspension of precipitated calcium carbonate, wherein the gas of step c) further comprises at least one gas other than carbon dioxide and the gas of step c) is introduced at a rate of 0.06 to 5.00 kg gas/h per kg of dry $Ca(OH)_2$, preferably at a rate of 0.09 to 4.00 kg gas/h per kg of dry $Ca(OH)_2$, and most preferably at a rate of 0.12 to 3.00 kg gas/h per kg of dry $Ca(OH)_2$.

According to another embodiment of the present invention in step e) the milk of lime obtained from step d) is carbonated with the gas of step c) to form an aqueous suspension of precipitated calcium carbonate, wherein the gas of step c) further comprises at least one gas other than carbon dioxide and the carbon dioxide is introduced at a rate of 0.05 to 3.50 kg $CO_2$/h per kg of dry $Ca(OH)_2$, preferably at a rate of 0.07 to 2.00 kg $CO_2$/h per kg of dry $Ca(OH)_2$, and most preferably at a rate of 0.10 to 1.50 kg $CO_2$/h per kg of dry $Ca(OH)_2$.

According to another embodiment of the present invention in step e) the milk of lime obtained from step d) is carbonated with the gas of step c) to form an aqueous suspension of precipitated calcium carbonate, wherein the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, preferably at a rate of 0.07 to 2.00 kg $CO_2$/h per kg of dry $Ca(OH)_2$, and most preferably at a rate of 0.10 to 1.50 kg $CO_2$/h per kg of dry $Ca(OH)_2$.

According to one embodiment of the present invention in step e) the milk of lime obtained from step d) is carbonated with the gas of step c) to form an aqueous suspension of precipitated calcium carbonate, wherein the gas of step c) further comprises at least one gas other than carbon dioxide and the gas of step c) is introduced at a rate of 0.06 to 5.00 kg gas/h per kg of dry $Ca(OH)_2$, preferably at a rate of 0.09 to 4.00 kg gas/h per kg of dry $Ca(OH)_2$, and most preferably at a rate of 0.12 to 3.00 kg gas/h per kg of dry $Ca(OH)_2$ with the proviso that the carbon dioxide is introduced at a rate of 0.10 to 1.50 kg $CO_2$/h per kg of dry $Ca(OH)_2$.

According to one embodiment of the present invention in step e) the milk of lime obtained from step d) is carbonated with the gas of step c) to form an aqueous suspension of precipitated calcium carbonate, wherein the carbonation is carried out in the presence of a static gas bubble comminution unit that is located in the milk of lime and the gas of step c) is flushed around and/or through the static gas bubble comminution unit.

The "static gas bubble comminution unit" is a structural element of an apparatus or a device or a containment, which is used to carry out the process of the present invention. According to one embodiment of the present invention the static gas bubble comminution unit is located in the apparatus or device or containment such that the gas can be flushed around and/or through the static gas bubble comminution unit. For example, the static gas bubble comminution unit may comprise a fluid-permeable structure that permits fluids and gas to diffuse through this structure.

The static gas bubble comminution unit consists of material(s) that do(es) not react with milk of lime or carbon dioxide. According to the present invention "static" means that the gas bubble comminution unit neither moves actively in the milk of lime nor is driven from an external power source. According to the present invention "gas bubble comminution" unit means that the unit may split up the gas flow in individual gas bubbles. In a preferred embodiment the obtained gas bubbles are nanobubbles and/or microbubbles and/or macrobubbles, i.e. bubbles having a diameter in the nanometre and/or micrometre and/or millimetre range. For example the nanobubbles have a diameter between 50 nm and 100 nm and the microbubbles have a diameter greater than 0.1 μm and less than 1 000 μm and the macrobubbles have a diameter between 1 mm and 100 mm.

According to one embodiment of the present invention the static gas bubble comminution unit comprises at least one gas permeable structure. "Gas permeable" according to the present invention means that gases can diffuse through this structure. Additionally, the structure may be fluid-permeable. "Fluid permeable" according to the present invention means that fluids can diffuse through this structure. The gas permeable structure may be selected from a porous substrate including a ceramic or plastic or metallic porous substrate, for example, a foam, a porous paper, or a gas permeable film, a net, a sieve, a perforated plate, a wire mesh, connected strings or connected fibres or filaments, or a filter cloth.

A foam according to the present invention can be an open-cell foam that is formed by trapping pockets of gas in a solid. Open-cell foams contain pores that are connected to each other and form an interconnected network. The pores will fill with whatever they are surrounded with and, therefore, the pores may be filled with the milk of lime prepared in step d) as well as the gas comprising carbon dioxide of step c). The foam may be a metallic foam, a ceramic foam, or a plastic foam. The skilled person knows how to prepare such foams. Foams that may be used to produce the static gas bubble comminution unit are commercially available, for example, from ERG Aerospace Corporation under the trade name Duocel® or from American Elements, US.

A porous paper according to the present invention can be any semi-permeable paper that comprises pores. According to one embodiment the pores are gas and fluid permeable. The porous paper may be, for example, a filter paper. Porous papers and especially filter papers are known to the skilled person and are commercially available, for example, from Macherey-Nagel under the trade name MN 753.

A gas permeable film according to the present invention can be any film that comprises pores. According to one embodiment the pores are gas and fluid permeable. The film is preferably a polymer film and may be obtained, for example, by evaporation, sputtering, pulsed laser deposition or plasma polymerization. Gas permeable films are known to the skilled person and are commercially available, for example, from Macherey-Nagel under the trade name Porafil® TE, Porafil® PE and Porafil® PC.

A net according to the present invention can be any textile in which the yarns are fused, looped or knotted at their intersections, resulting in a fabric with open spaces between the yarns. The yarns may be, for example, metallic yarns, ceramic yarns, or polymer yarns. A sieve or a wire mesh according to the present invention is a loosely woven sheet, for example, made from metallic yarns, ceramic yarns, or polymer yarns. Possible nets or sieves that may be used in the present invention are known to the skilled person and are commercially available, for example, from Progress Siebe GmbH, Germany or from Infiltec GmbH, Germany.

A perforated plate according to the present invention can be any plate that comprises perforations. According to one embodiment the perforations are gas and fluid permeable. The perforations may have the shape of tubes, cones, circles, stars, slits and the like. The perforated plate comprises at least one perforation, preferably at least 10 perforations, more preferably at least 20 perforations, and most preferably at least 50 perforations. Possible perforated plates that may be used in the present invention are known to the skilled person and are commercially available, for example, from TecMetall under the trade name ConiPerf®.

Connected strings or connected fibres or filaments according to the present invention can be any strings or fibres or filaments that are located to each other that a lose net is formed. The strings or fibres or filaments may be made of metallic, ceramic, polymeric or textile materials. Possible connected strings or connected fibres or filaments that may be used in the present invention are known to the skilled person and are commercially available, for example, from Donaldson Filtration Deutschland GmbH, Germany under the trade name Tetratex®.

A filter cloth according to the present invention can be a filter that is produced of cloth. Cloth is a fibre or textile material that can be made out of fibre plants such as cotton, plastics such as polyester or polypropylene, or animal skin and hair such as wool. Possible filter cloths that may be used in the present invention are known to the skilled person and are commercially available, for example, from Kavon Filter Products Company, Co., US, under the trade name polypropylene filter cloth 45PP or from Micronics Inc., US.

The static gas bubble comminution unit may be in any suitable form, for example, in the form of a sheet, plate, cube, ball or a rod and preferably in the form of a plate. The plate may be round or polygonal, for example triangular, square, pentagonal, or hexagonal. In a preferred embodiment the shape of the plate corresponds with the base area of the apparatus or device or containment, in which the static gas bubble comminution unit is located.

The static gas bubble comminution unit is arranged in the containment such that it is located within the milk of lime. Furthermore, according to one embodiment of the present invention the static gas bubble comminution unit comprises at least one gas and fluid permeable structure. According to one embodiment of the present invention the static gas bubble comminution unit comprises only one gas permeable structure. According to another preferred embodiment of the present invention the static gas bubble comminution unit comprises more than one gas permeable structure, for example, two, three, four, five or six fluid permeable structures. The gas permeable structures may be different or may all be the same. According to a preferred embodiment the gas permeable structures used in the inventive process are identical.

According to one embodiment of the present invention the two or more gas permeable structures may be arranged side by side or successively with respect to the gas inlet. According to a preferred embodiment of the present invention the two or more gas-permeable structures are arranged successively with respect to the gas inlet such that the gas flows through all fluid-permeable structures one after the other.

According to one embodiment of the present invention the gas-permeable structure comprises pores or perforations that are gas permeable. Preferably the gas-permeable structure comprises perforations, and most preferably in the shape of tubes or circles. The perforations have a diameter between 50 nm and 100 mm, preferably between 100 nm and 80 mm, more preferably between 500 nm and 60 mm, and most preferably between 1 mm and 50 mm.

According to one embodiment of the present invention the static gas bubble comminution unit is not a stirrer. According to another embodiment of the present invention the milk of lime is not stirred mechanically during step e).

According to another embodiment of the present invention in step e) of the process of the present invention, the milk of lime obtained from step d) is carbonated with the gas of step c) to form an aqueous suspension of precipitated calcium carbonate, wherein i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, or ii) the carbonation is carried out in the presence of a static gas bubble comminution unit that is located in the milk of lime and the gas of step c) is flushed around and/or through the static gas bubble comminution unit.

According to another embodiment of the present invention in step e) of the process of the present invention, the milk of lime obtained from step d) is carbonated with the gas of step c) to form an aqueous suspension of precipitated calcium carbonate, wherein i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and ii) the carbonation is carried out in the presence of a static gas bubble comminution unit that is located in the milk of lime and the gas of step c) is flushed around and/or through the static gas bubble comminution unit.

The inventors of the present invention surprisingly found that it is advantageous to perform the carbonation step without stirring. For example, the abrasion of the equipment in comparison to agitated reactors is reduced. Furthermore, energy can be saved since no stirrer or agitator has to be driven. Additionally, the inventors surprisingly observed up to 80% less vibration in the system when no stirrer or agitator is used. For example, the vibrations were reduced from 1 mm/sec to 0.2 mm/sec in the system when no stirrer or agitator is used. Therefore, turbulence or vortices in the milk of lime and during carbonation can be avoided or reduced. Furthermore, due to the less vibration the building components of the carbonation system are less stressed and, therefore, may have a longer durability. Furthermore, the inventors observed that noise can be reduced in the system when no stirrer or agitator is used, for example, from 96 dB to 65 dB.

Furthermore, the inventors of the present invention found that by introducing the gas of step c), which further comprises at least one gas other than carbon dioxide, at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$ and/or by injecting the gas of step c) such that it is flushed around and/or through a static gas bubble comminution unit, nanobubbles and/or microbubbles and/or macrobubbles of the gas can be formed in the milk of lime.

Without being bound to any theory the inventors believe that the nanobubbles and/or microbubbles and/or macrobubbles may promote the formation of precipitated calcium carbonate with specific characteristics. More precisely, the nanobubbles and/or microbubbles and/or macrobubbles may allow the formation of the inventive precipitated calcium carbonate having improved resistance to structural breakdown, especially improved resistance to compression.

In the meaning of the present invention "microbubbles" are gas bubbles that are located in the milk of lime and have a diameter greater than 0.1 μm and less than 1 000 μm, preferably between 1 μm and 800 μm, more preferably between 100 μm and 600 μm and most preferably between 200 μm and 500 μm.

In the meaning of the present invention "nanobubbles" are gas bubbles that are located in the milk of lime and have a diameter between 50 nm and 100 nm, preferably between 60 nm and 90 nm, and most preferably between 70 nm and 80 nm.

In the meaning of the present invention "macrobubbles" are gas bubbles that are located in the milk of lime and have a diameter between 1 mm and 100 mm, preferably between 10 mm and 90 nm, more preferably between 30 mm and 80 mm and most preferably between 50 mm and 70 mm.

According to one embodiment of the present invention the nanobubbles and/or microbubbles and/or macrobubbles can be obtained by carbonating the milk of lime obtained from step d) with the gas of step c) wherein i) the gas of step c)

further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or wherein ii) the carbonation is carried out in the presence of a static gas bubble comminution unit that is located in the milk of lime and the gas of step c) is flushed around and/or through the static gas bubble comminution unit. No additional stirring is required during step e) to provide the nanobubbles and/or microbubbles and/or macrobubbles. According to a preferred embodiment of the present invention step e) is performed without stirring.

The progress of the carbonation reaction can be readily observed by measuring the conductivity, density, turbidity and/or pH. In this respect, the pH of the milk of lime before addition of carbon dioxide will be more than 10, usually between 11 and 12.5, and will constantly decrease until a pH of about 7 is reached. At this point the reaction can be stopped. According to a preferred embodiment the reaction is stopped when the pH of suspension during carbonation step e) is between 7.0 and 9.5, more preferably between 7.6 and 7.8, and most preferably at 7.8.

Conductivity slowly decreases during the carbonation reaction and rapidly decreases to low levels, when the precipitation is completed. The progress of the carbonation may be monitored by measuring the pH and/or the conductivity of the reaction mixture.

According to one embodiment of the present invention, the temperature of the milk of lime obtained from step d), which is employed in step e) is adjusted to be in the range from 5° C. to 100° C., preferably in the range of 7° C. to 95° C. and more preferably in the range of 10° C. to 75° C. It will be apparent to the skilled person that the initial temperature of the milk of lime is not necessarily the same one as the temperature of the mixture prepared in step d) due to the exothermic carbonation reaction and/or due to the mixing of substances having different temperatures.

According to one embodiment of the present invention, step e) is carried out at a temperature from 5° C. to 95° C., preferably from 10° C. to 80° C., and more preferably from 20° C. to 70° C.

Process step e) can be carried out in form of a batch process, a semi-continuous or a continuous process. According to one embodiment, the process of the present invention involving the process steps a) to d) is carried out in form of a batch process, a semi-continuous or a continuous process.

According to one embodiment of the present invention, the obtained suspension of precipitated calcium carbonate has a solids content of at least 5 wt.-%, preferably from 10 to 50 wt.-%, more preferably from 12 to 30 wt.-%, even more preferably from 18 to 26 wt.-%, and most preferably from 20 to 25 wt.-%, based on the total weight of the suspension. According to a exemplified embodiment of the present invention the obtained suspension of precipitated calcium carbonate has a solids content of about 22 wt.-%.

According to another embodiment of the present invention, the obtained suspension of precipitated calcium carbonate has a high solids content of at least 30 wt.-%, preferably from 35 to 90 wt.-%, more preferably from 40 to 85 wt.-%, even more preferably from 50 to 80 wt.-%, and most preferably from 55 to 75 wt.-%, based on the total weight of the suspension.

According to one embodiment of the present invention, the suspension of PCC of step e) has a Brookfield viscosity of less than or equal to 1 000 mPa·s at 25° C., more preferably less than or equal to 800 mPa·s at 25° C., and most preferably less than or equal to 600 mPa·s at 25° C. The Brookfield viscosity may be measured at 100 rpm.

Additional Process Steps

The process of the present invention can comprise additional process steps.

The milk of lime may be screened in order to remove oversize particles. A suitable screen can include, for example, a screen having a sieve size from 700 to 100 µm, for example, about 100 or about 300 µm. According to one embodiment of the present invention, the milk of lime is screened after step d) and before step e), preferably with a screen having a sieve size from 100 to 300 µm.

According to one embodiment of the present invention the milk of lime is stirred during step e). Stirring or agitation may be performed by any device that is mechanically driven from an external power source, for example, a stirrer.

According to a further aspect of the present invention, a process for producing precipitated calcium carbonate is provided, the process comprising the steps of:
a) providing a calcium oxide containing material,
b) providing an aqueous solution,
c) providing a gas comprising carbon dioxide,
d) preparing a milk of lime comprising $Ca(OH)_2$ by mixing the aqueous solution of step b) with the calcium oxide containing material of step a),
e) carbonating the milk of lime obtained from step d) with the gas of step c) to form an aqueous suspension of precipitated calcium carbonate, wherein
  i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or
  ii) the carbonation is carried out in the presence of a static gas bubble comminution unit that is located in the milk of lime and the gas of step c) is flushed around and/or through the static gas bubble comminution unit,
f) separating the precipitated calcium carbonate from the aqueous suspension obtained from step e), and optionally
g) drying the separated precipitated calcium carbonate obtained from step f).

For the purpose of the present invention, the expression "separating" means that the PCC is removed or isolated from the aqueous suspension obtained from step e) of the inventive process. The precipitated calcium carbonate obtained from step e) may be separated from the mother liquor by any conventional means of separation known to the skilled person. According to one embodiment of the present invention, in process step f) the PCC is separated mechanically and/or thermally. Examples for mechanical separation processes are filtration, e.g. by means of a drum filter or filter press, nanofiltration, or centrifugation. An example for a thermal separation process is an up-concentration process by the application of heat, for example, in an evaporator. According to a preferred embodiment, in process step f) the PCC is separated mechanically, preferably by filtration and/or centrifugation.

It is also preferred that the mother liquor obtained after precipitation and/or any one of the reactants may be recycled into the process.

The PCC obtained in step e) may be further processed, e.g., may be deagglomerated or subjected to a dry grinding step. Otherwise, it may also be wet ground in form of a suspension. If the PCC is subjected to dewatering, dispersion and/or grinding steps, these steps may be accomplished by procedures known in the art. Wet grinding may be carried out in the absence of a grinding aid or in the presence of a grinding aid. One or more grinding agents can be included, such as, e.g., sodium polyacrylate, a salt of polyacrylate acid, and/or a salt of a copolymer of acrylic acid. Dispersants also can be included to prepare dispersions if desired.

According to one embodiment of the present invention, a process for producing dried precipitated calcium carbonate is provided, the process comprising the steps of:
a) providing a calcium oxide containing material,
b) providing an aqueous solution,
c) providing a gas comprising carbon dioxide,
d) preparing a milk of lime comprising $Ca(OH)_2$ by mixing the aqueous solution of step b) with the calcium oxide containing material of step a),
e) carbonating the milk of lime obtained from step d) with the gas of step c) to form an aqueous suspension of precipitated calcium carbonate, wherein
   i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or
   ii) the carbonation is carried out in the presence of a static gas bubble comminution unit that is located in the milk of lime and the gas of step c) is flushed around and/or through the static gas bubble comminution unit,
f) separating the precipitated calcium carbonate from the aqueous suspension obtained from step e), and
g) drying the separated precipitated calcium carbonate obtained from step f).

Optionally, the process for producing dried precipitated calcium carbonate further comprises a step of concentrating the separated precipitated calcium carbonate obtained from step f) and before step g). Suitable concentration methods are known to the skilled person. For example, the desired concentration may be achieved by means of a thermal process, e.g., in an evaporator under ambient, atmospheric pressure or at reduced pressure, or by means of a mechanical process, e.g., in a filter press, such as nanofiltration, and/or centrifugation.

In general, the drying step g) may take place using any suitable drying equipment and can, for example, include thermal drying and/or drying at reduced pressure using equipment such as an evaporator, a flash drier, an oven, a spray drier and/or drying in a vacuum chamber.

According to one embodiment, drying step g) is a spray drying step, preferably said spray drying step is carried out at a lower temperature ranging from 120° C. to 750° C., preferably from 200° C. to 400° C., and most preferably from 250° C. to 350° C. By means of drying step g), a dried precipitated calcium carbonate is obtained having a low total moisture content which is less than or equal to 1.0 wt.-%, based on the total weight of the dried precipitated calcium carbonate.

According to another embodiment, the dried PCC obtained in step g) has a total moisture content of less than or equal to 0.5 wt.-% and preferably less than or equal to 0.2 wt.-%, based on the total weight of the dried precipitated calcium carbonate. According to still another embodiment, the dried PCC of step g) has a total moisture content of between 0.01 and 0.15 wt.-%, preferably between 0.02 and 0.10 wt.-%, and more preferably between 0.03 and 0.07 wt.-%, based on the total weight of the dried precipitated calcium carbonate.

The precipitated calcium carbonate obtained by the inventive process can be post-treated, for example, during and/or after a drying step with an additional component. According to one embodiment the precipitated calcium carbonate is treated with a fatty acid, e.g. stearic acid, a silane, or phosphoric esters of fatty acids, or a siloxane.

According to one embodiment of the present invention the process further comprises a step h) of contacting at least a part of the surface of the precipitated calcium carbonate, preferably the precipitated calcium carbonate obtained from step g) with a surface-treatment agent to produce a surface-coated precipitated calcium carbonate. Suitable surface-treatment agents are, for example, fatty acids, fatty acid esters, aliphatic carboxylic acids, aliphatic carboxylic esters, polyacrylates, polydiallyldimethylammonium chloride (polyDADMAC), mono-substituted succinic anhydrides, mono-substituted succinic acids, or phosphoric acid esters.

According to one embodiment the surface-treatment agent is selected from mono-substituted succinic anhydrides, mono-substituted succinic acids, phosphoric acid esters, and mixtures thereof. The term "mono-substituted succinic anhydride" in the meaning of the present invention refers to a succinic anhydride wherein a hydrogen atom is substituted by another substituent. The term "mono-substituted succinic acid" in the meaning of the present invention refers to a succinic acid wherein a hydrogen atom is substituted by another substituent. Further details regarding said surface-treatment agents and methods for preparing surface-treated calcium carbonate products thereof are described in WO 2014/060286 A1 and WO 2014/128087 A1.

Carbonation System

The process according to the present invention may be performed in any suitable carbonation system.

According to the present invention a carbonation system for producing a precipitated calcium carbonate according to the present invention is provided, comprising
A) a containment for milk of lime,
B) at least one inlet for gas, wherein the at least one inlet is arranged such that it is covered with the milk of lime, and
C) a static gas bubble comminution unit, wherein the static gas bubble comminution unit is arranged in the containment such that it is located in the milk of lime, wherein the at least one inlet of gas and the static gas bubble comminution unit are aligned to each other such that the gas provided by the at least one inlet for gas is flushed around and/or through the static gas bubble comminution unit.

According to a preferred embodiment of the present invention the carbonation system comprises at least one outlet for the aqueous suspension of precipitated calcium carbonate.

According to one embodiment of the present invention the carbonation system comprises additionally D) a stirrer.

According to item C) the system comprises a static gas bubble comminution unit, wherein the static gas bubble comminution unit is arranged in the containment such that it is located in the milk of lime. As set out under step e) the static gas bubble comminution unit may comprises at least one gas-permeable structure. According to one embodiment of the present invention the static gas bubble comminution unit comprises only one gas-permeable structure. According to another preferred embodiment of the present invention the static gas bubble comminution unit comprises more than one gas-permeable structure, for example, two, three, four, five or six gas-permeable structures. The gas-permeable structures may be different or may all be the same. According to a preferred embodiment the gas-permeable structures used in the inventive process are identical.

According to one embodiment of the present invention the two or more gas-permeable structures may be arranged side by side or successively with respect to the gas inlet. According to a preferred embodiment of the present invention the two or more gas-permeable structures are arranged successively with respect to the gas inlet such that the gas flows through all gas-permeable structures one after the other.

Further details regarding the structure of the inventive carbonation system can be found under process step e).

Products and their Use

According to one embodiment the present invention, a precipitated calcium carbonate is provided, which is obtained by a process comprising the steps of:
 a) providing a calcium oxide containing material,
 b) providing an aqueous solution,
 c) providing a gas comprising carbon dioxide,
 d) preparing a milk of lime comprising $Ca(OH)_2$ by mixing the aqueous solution of step b) with the calcium oxide containing material of step a),
 e) carbonating the milk of lime obtained from step d) with the gas of step c) to form an aqueous suspension of precipitated calcium carbonate, wherein
  i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or
  ii) the carbonation is carried out in the presence of a static gas bubble comminution unit that is located in the milk of lime and the gas of step c) is flushed around and/or through the static gas bubble comminution unit.

Furthermore, the process may comprise the steps of
 f) separating the precipitated calcium carbonate from the aqueous suspension obtained from step e), and optionally
 g) drying the separated precipitated calcium carbonate obtained from step f).

According to one embodiment of the present invention the precipitated calcium carbonate obtained by the inventive process has a specific surface area from 2.0 to 80.0 m²/g, preferably from 2.5 to 13.0 m²/g, more preferably from 3.0 to 12.0 m²/g, and most preferably from 3.5 to 10.0 m²/g, measured using nitrogen and the BET method according to ISO 9277:1995.

According to one embodiment the precipitated calcium carbonate obtained in step e) is in form of particles having a weight median particle size $d_{50}$ of between 1.0 and 9.0 μm, preferably of between 1.2 and 3.7 μm, more preferably of between 1.6 and 3.5 μm, even more preferably of between 1.8 and 3.0 μm and most preferably of between 2.0 and 2.6 μm.

Precipitated calcium carbonate exists in three primary crystalline forms: calcite, aragonite and vaterite, and there are many different polymorphs (crystal habits) for each of these crystalline forms. According to one embodiment of the present invention the precipitated calcium carbonate obtained by the inventive process is in the form of particles having a crystal form selected from the group consisting of an aragonitic, vateritic, calcitic crystal form and mixtures thereof, and preferably the crystal form of the precipitated calcium carbonate particles is calcitic.

According to one embodiment of the present invention the precipitated calcium carbonate obtained by the inventive process is in the form of particles wherein the form of the precipitated calcium carbonate particles is calcitic. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC) and preferably the crystal habits are scalenohedral (S-PCC), rhombohedral (R-PCC) or colloidal (C-PCC). The morphological structure of the precipitated calcium carbonate can also be controlled by carrying out process step e) in a specific temperature range. According to one embodiment of the present invention, step e) is carried out at a temperature from 40 to 60° C. to form an aqueous suspension of scalenohedral PCC. According to another embodiment of the present invention, step e) is carried out at a temperature from 8 to 25° C. to form an aqueous suspension of rhombohedral PCC.

According to another embodiment of the present invention the precipitated calcium carbonate obtained by the inventive process is in the form of particles wherein the form of the precipitated calcium carbonate particles is aragonitic. Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

According to one embodiment of the present invention the precipitated calcium carbonate obtained by the inventive process has an ISO brightness R457 of at least 80%, preferably between 80 and 99%, more preferably between 85 and 98% and most preferably between 90 and 97%, measured according to ISO 2469.

According to one embodiment of the present invention the precipitated calcium carbonate obtained by the inventive process has a steepness factor $d_{75/25}$ of between 1.40 and 2.40 preferably of between 1.60 and 2.35, even more preferably of between 1.70 and 2.30 and most preferably of between 1.85 and 2.25.

According to one embodiment of the present invention the precipitated calcium carbonate obtained by the inventive process has a friability value that is at least 2% lower than the friability value of precipitated calcium carbonate that has been obtained by a process according to the state of the art.

According to a preferred embodiment of the present invention the friability value of the precipitated calcium carbonate obtained by the process according to the present invention wherein the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or wherein the carbonation is carried out in the presence of a static gas bubble comminution unit that is located in the milk of lime and the gas of step c) is flushed around and/or through the static gas bubble comminution unit, is at least 2% lower than the friability value of precipitated calcium carbonate that has been obtained by the same process but differs from said process in that the flow of the gas in the carbonation step is not introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or wherein the carbonation is carried out without a static gas bubble comminution unit that is located in the milk of lime.

According to one aspect of the present invention an aqueous suspension comprising the precipitated calcium carbonate obtained by the process according to the present invention is provided.

According to one embodiment of the present invention, the aqueous suspension comprising the precipitated calcium carbonate obtained by the process according to the present invention has a solids content of at least 5 wt.-%, preferably from 10 to 50 wt.-%, more preferably from 12 to 30 wt.-%, even more preferably from 18 to 26 wt.-%, and most preferably from 20 to 25 wt.-%, based on the total weight of the suspension. According to a exemplified embodiment of the present invention the obtained suspension of precipitated calcium carbonate has a solids content of about 22 wt.-%.

According to one embodiment of the present invention, the aqueous suspension comprising the precipitated calcium carbonate obtained by the process according to the present invention has a Brookfield viscosity of less than or equal to 1 000 mPa·s at 25° C., more preferably less than or equal to 800 mPa·s at 25° C., and most preferably less than or equal to 600 mPa·s at 25° C. The Brookfield viscosity may be measured at 100 rpm.

According to one aspect of the present invention, a surface-coated precipitated calcium carbonate comprising the precipitated calcium carbonate and a surface-coating is provided. The surface-coated precipitated calcium carbonate is obtained by a process comprising the steps of:
a) providing a calcium oxide containing material,
b) providing an aqueous solution,
c) providing a gas comprising carbon dioxide,
d) preparing a milk of lime comprising $Ca(OH)_2$ by mixing the aqueous solution of step b) with the calcium oxide containing material of step a),
e) carbonating the milk of lime obtained from step d) with the gas of step c) to form an aqueous suspension of precipitated calcium carbonate, wherein
  i) the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$, and/or
  ii) the carbonation is carried out in the presence of a static gas bubble comminution unit that is located in the milk of lime and the gas of step c) is flushed around and/or through the static gas bubble comminution unit,
f) separating the precipitated calcium carbonate from the aqueous suspension obtained from step e),
g) drying the separated precipitated calcium carbonate obtained from step f), and
h) contacting at least a part of the surface of the precipitated calcium carbonate with a surface-treatment agent.

The inventors of the present invention surprisingly found that the precipitated calcium carbonate obtained by the process according to the present invention has improved properties and in particular shows improved resistance to structural breakdown, especially shows improved resistance to compression. For example, the precipitated calcium carbonate of the present invention has a stronger resistance of the precipitated calcium carbonate clusters/crystals during processing (i.e. lesser tendency to form discrete precipitated calcium carbonate particles) than conventional precipitated calcium carbonate and improves the mechanical properties such as stiffness of products in which it is used, for example, in papers.

The precipitated calcium carbonate or the surface-coated precipitated calcium carbonate obtained by the process according to the present invention may be used in various materials. According to one embodiment of the present invention, the precipitated calcium carbonate obtained by the process of the present invention is used in paper, paper products, paper coatings, ink, paint, coating, plastics, polymer compositions, adhesives, building products, foodstuff, agricultural products, cosmetic products or pharmaceutical products, preferably in paper, more preferably in paper coatings and most preferably in uncoated woodfree paper. According to another embodiment of the present invention, the surface-coated precipitated calcium carbonate obtained by the process according to the present invention is used in paper, paper products, paper coatings, ink, paint, coating, plastics, polymer compositions, adhesives, building products, foodstuff, agricultural products, cosmetic products or pharmaceutical products, preferably in paper, more preferably in paper coatings and most preferably in uncoated woodfree paper.

The scope and interest of the present invention will be better understood based on the following examples which are intended to illustrate certain embodiments of the present invention and are non-limitative.

EXAMPLES

1. Measurement Methods

In the following, measurement methods implemented in the examples are described.

Friability Value

The aqueous suspension of precipitated calcium carbonate was filtered and the residue was rinsed with water and dried in an oven at 100° C. to obtain the precipitated calcium carbonate. The dried precipitated calcium carbonate was shaken through a 1 mm mesh sieve to reduce larger agglomerates.

The dried and sieved precipitated calcium carbonate was formed into tablets by placing 11.5 g of the precipitated calcium carbonate in a press chamber of the manually operated hydraulic press Herzog TP 40/2D, Herzog Maschinenfabrik GmbH & Co, Osnabruck, Germany. The press chamber was closed by placing a piston/lid on top of the press chamber. The PCC was compacted in the press for 5 minutes at predetermined pressures of 60 MPa, 90 MPa, and 120 MPa, 240 MPa and 300 MPa. After 5 minutes the press chamber was opened and a calcium carbonate tablet with a diameter of 4 cm was obtained.

The pore volume and the pore size distribution was calculated from a mercury intrusion porosimetry measurement using a Micrometrics Autopore V mercury porosimeter. The mercury porosimetry experiment entailed the evacuation of the obtained tablet to remove trapped gases, after which the tablet was surrounded with mercury. The amount of mercury displaced by the tablet allows calculation of the sample's bulk volume, $V_{bulk}$. Pressure was then applied to the mercury so that it intruded into the tablet through pores connected to the external surface. The maximum applied pressure of mercury was 414 MPa, equivalent to a Laplace throat diameter of 0.004 μm. The data were corrected using Pore-Comp (Gane et al. "Void Space Structure of Compressible Polymer Spheres and Consolidated Calcium Carbonate Paper-Coating Formulations", Industrial and Engineering Chemistry Research 1996, 35 (5):1753-1764) for mercury and penetrometer effects, and also for sample compression.

By taking the first derivative of the cumulative intrusion curve the pore size distribution based on equivalent Laplace diameter assuming a mercury-solid surface contact angle of 140° and mercury surface tension of 480 dyn·cm$^{-1}$, inevitably including the effect of pore-shielding when present, was revealed. The pore diameter of the sample is defined as the peak maximum of the pore size distribution, i.e. volume modal pore size.

The compaction pressure of the tablet formation, x, was plotted versus said pore diameter, y. The graph was fitted with the logarithmic equation y=a−b·lnx. The fit was performed with the computer program SYSTAT 5.0 for Windows, available from SYSTAT Software Inc., San Jose, US.

The normalized specific pore volume difference was calculated by the formula 100·[(total specific pore volume at 60 MPa−total specific pore volume at the given pressure greater than 60 MPa)/total specific pore volume at 60 MPa] e.g. the normalized specific pore volume difference between measurements at 60 MPa and 120 MPa is given by 100·[(total specific pore volume at 60 MPa−total specific pore volume at 120 MPa)/total specific pore volume at 60 MPa].

The compaction pressure of the tablet formation, x, was plotted versus the normalised specific pore volume difference, y, as calculated by the formula above. The graph was fitted with the logarithmic equation y=c−d·lnx. The fit was performed with the computer program SYSTAT 5.0 for Windows, available from SYSTAT Software Inc., San Jose, US.

The friability value is calculated as the product of b and d.

Furthermore, the coefficient of determination $R^2$ of the b and d values is calculated by the formula $R^2$=1−SSE/SSM, wherein SSE is the sum of the squared errors and SSM is the sum of squares about the mean.

Particle Size Distribution of Precipitated Calcium Carbonate (PCC) and Steepness Factor The particle size distribution of the prepared PCC particles was measured using a Sedigraph™ 5120. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added. The "steepness factor" $d_{75/25}$ was calculated as the quotient of the $d_{75}$ and the $d_{25}$ value.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 sec, standard drying of 5 to 20 g of suspension.

Specific Surface Area (SSA)

The specific surface area was measured via the BET method according to ISO 9277 using nitrogen, following conditioning of the sample by heating at 250° C. for a period of 30 minutes. Measurement was performed with a TriStar II from Micromeritics, US. Prior to such measurements, the sample is filtered within a Buchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

X-Ray Diffraction

The purity of the PCC samples was analysed with a D8 Advance powder diffractometer (Bruker Corporation, USA) obeying Bragg's law. This diffractometer consisted of a 2.2 kW X-ray tube (Cu), a sample holder, a ϑ-ϑ goniometer, and a VÁNTEC-1 detector. Nickel-filtered Cu $K_α$ radiation was employed in all experiments ($λK_{α-Cu}$=1.5406 Å). The profiles were chart recorded automatically using a scan speed of 0.7° per minute in 2ϑ (XRD GV_7600). The measurement was carried out at angles from 2ε=5° to 70°.

The resulting powder diffraction pattern was classified by mineral content using the DIFFRAC$^{suite}$ software packages EVA and SEARCH, based on reference patterns of the ICDD PDF 2 database (XRD LTM_7603). Quantitative analysis of the diffraction data, i.e. the determination of amounts of different phases in a multi-phase sample, has been performed using the DIFFRAC$^{suite}$ software package TOPAS (XRD LTM_7604). This involved modelling the full diffraction pattern (Rietveld approach) such that the calculated pattern(s) duplicated the experimental one.

Brightness Measurement and Yellowness Index

The pigment brightness and yellowness index of the obtained particles were measured using an ELREPHO 450× from the company Datacolor according to ISO 2469 and DIN 6167, respectively.

The samples were dried in an oven at 105° C. to a residual moisture content of <0.5% by weight and the resulting powder was treated to deagglomerate the powder particles. From 12 g of said powder a tablet was pressed via application of 4 bar pressure for 15 s. The resulting powder tablet with a diameter of 45 mm was then subjected to the measurement.

In the present measurement the yellowness index was measured via measuring the reflectance of the obtained precipitated calcium carbonate product, the illuminant used being D 65 and the standard observer function being 10°.

The Yellowness Index according to DIN 6167 is calculated as follows:

$$YI\ (DIN\ 6167) = \frac{a \times X - b \times Z}{Y} \times 100$$

where X, Y, and Z are the CIE Tristimulus values and the coefficients depend on the illuminant and the observer function as indicated in the Table below:

| | |
|---|---|
| Illuminant | D 65 |
| Observer | 10° |
| a | 1.301 |
| b | 1.149 |

Brookfield Viscosity

The Brookfield viscosity of the liquid coating compositions was measured after one hour of production and after one minute of stirring at 25° C.±1° C. at 100 rpm by the use of a Brookfield viscometer type RVT equipped with an appropriate disc spindle, for example spindle 2 to 5.

pH Value

The pH of a suspension or solution was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Sigma-Aldrich Corp., USA). The reported pH values are the endpoint values detected by the instrument (the endpoint was when the measured signal differed by less than 0.1 mV from the average over the last 6 seconds).

2. Examples

Example 1

Comparative Examples 1A and 1B

A milk of lime was prepared by mixing under mechanical stirring 5.00 kg water with 1.334 kg calcium oxide obtained from the US at an initial temperature of 40° C. The obtained mixture was stirred for 30 min, wherein additional 3.73 kg water was added. Subsequently, the mixture was sieved through a 100 µm screen.

10 kg of the obtained milk of lime were transferred into a stainless steel reactor and heated to 50° C. The stainless steel reactor contained a propeller stirrer. Then the milk of lime was carbonated by introducing gas consisting only of $CO_2$ at a rate of 0.472 kg gas/h per kg dry $Ca(OH)_2$. The reaction was monitored by online pH and conductivity measurements.

The precipitated calcium carbonate was obtained by filtering the suspension and rinsing the residue with water and drying the obtained precipitated calcium carbonate in an oven at 100° C. The dried precipitated calcium carbonate was shaken through a 1 mm mesh sieve to reduce larger agglomerates. The purity of the obtained precipitated calcium carbonate was controlled by X-ray diffraction using the method described above.

The reaction parameters and characteristics of the prepared PCCs are listed in Table 1 below and the b and d values with the corresponding $R^2$ values as well as the friability values are listed in Table 2 below.

TABLE 1 reaction parameters and characteristics of the prepared PCCs of the comparative Examples 1A and 1B

| Example | stirrer speed during carbonation | weight median particle size $d_{50}$/µm | BET/ $m^2 g^{-1}$ | steepness $d_{75}/d_{25}$ |
|---|---|---|---|---|
| 1A | 700 rpm | | | |
| 1B | stirrer off | 2.21 | 5.2 | 1.73 |

TABLE 2 friability values of the prepared PCCs of the Comparative Examples 1A and 1B

| Example | b | $R^2$ of line fit for b | d | $R^2$ of line fit for d | b · d (absolute) | b · d (percentage) | reduction of friability |
|---|---|---|---|---|---|---|---|
| 1A | 0.1163 | 0.99 | 27.4291 | 1.00 | 3.19 | 100 | |
| 1B | 0.1151 | 1.00 | 27.4437 | 0.99 | 3.16 | 99.06 | 0.94 |

As can be seen from Table 2 the Comparative Example 1B which is not stirred during carbonation has a friability value that is 0.94% lower than the friability value of precipitated calcium carbonate that has been obtained by a similar process, wherein the carbonation is carried out under stirring at 700 rpm.

Example 2

Comparative Examples 2A, 3A and 4A

A milk of lime was prepared by mixing under mechanical stirring 5.00 kg water with 1.334 kg calcium oxide obtained from Austria for Example 2A, from France for Example 3A and from Brazil for Example 4A at an initial temperature of 40° C. for Examples 2A and 3A and at an initial temperature of 50° C. for Example 4A. The obtained mixture was stirred for 30 min, wherein additional 3.73 kg water was added. Subsequently, the mixture was sieved through a 100 µm screen.

10 kg of the obtained milk of lime were transferred into a stainless steel reactor and heated to 50° C. for Examples 2A and 3A and heated to 55° C. for Example 4A. The stainless steel reactor contained a propeller stirrer. Then the milk of lime was carbonated by introducing gas consisting only of $CO_2$ at a rate listed in table 3.

During the carbonation step, the reaction mixture was stirred with the speed listed in table 3. The reaction was monitored by online pH and conductivity measurements.

The precipitated calcium carbonate was obtained by filtering the suspension and rinsing the residue with water and drying the obtained precipitated calcium carbonate in an oven at 100° C. The dried precipitated calcium carbonate was shaken through a 1 mm mesh sieve to reduce larger agglomerates. The purity of the obtained precipitated calcium carbonate was controlled by X-ray diffraction using the method described above.

The reaction parameters and characteristics of the prepared PCCs are listed in Table 3 below.

TABLE 3 reaction parameters and characteristics of the prepared PCCs of the Comparative Examples 2A, 3A and 4A

| Ex. | stirrer speed during carbonation | kg gas/h per kg dry $Ca(OH)_2$ | weight median particle size $d_{50}$/µm | BET/ $m^2 g^{-1}$ | steepness $d_{75}/d_{25}$ |
|---|---|---|---|---|---|
| 2A | 700 rpm | 0.472 | 2.22 | 6.2 | 1.93 |
| 3A | 380 rpm | 0.124 | 2.20 | 3.8 | 1.84 |
| 4A | 700 rpm | 0.248 | 2.34 | 4.8 | 1.82 |

Inventive Examples 2B, 3B, 3C and 4B

A milk of lime was prepared by mixing under mechanical stirring 5.00 kg water with 1.334 kg calcium oxide obtained from Austria for Example 2B, from France for Examples 3B and 3C and from Brazil for Example 4B at an initial temperature of 40° C. for Examples 2B, 3B and 3C and at an initial temperature of 50° C. for Example 4B. The obtained mixture was stirred for 30 min, wherein additional 3.73 kg water was added. Subsequently, the mixture was sieved through a 100 µm screen.

10 kg of the obtained milk of lime were transferred into a stainless steel reactor and heated to 50° C. for Examples 2B, 3B and 3C and heated to 55° C. for Example 4B. The stainless steel reactor contained a static gas bubble comminution unit in the form of a gas permeable perforated plate. In addition to the gas bubble comminution unit the stainless steel reactor further contained a propeller stirrer for Example 3C and the reaction mixture was stirred during the carbonation step with the speed listed in table 4. The milk of lime was carbonated in the presence of the static gas bubble comminution unit that was located in the milk of lime by introducing gas consisting only of $CO_2$ at a rate listed in table 4. The gas was flushed around and through the static gas bubble comminution unit. The reaction was monitored by online pH and conductivity measurements.

The precipitated calcium carbonate was obtained by filtering the suspension and rinsing the residue with water and drying the obtained precipitated calcium carbonate in an oven at 100° C. The dried precipitated calcium carbonate was shaken through a 1 mm mesh sieve to reduce larger agglomerates. The purity of the obtained precipitated calcium carbonate was controlled by X-ray diffraction using the method described above.

The reaction parameters and characteristics of the prepared PCCs are listed in Table 4 below.

TABLE 4 reaction parameters and characteristics of the prepared PCCs of the inventive Examples 2B, 3B, 3C and 4B

| Ex. | stirrer speed during carbonation | kg gas/h per kg dry Ca(OH)$_2$ | weight median particle size d$_{50}$/μm | BET/ m$^2$ g$^{-1}$ | steepness d$_{75}$/d$_{25}$ |
|---|---|---|---|---|---|
| 2B | no stirrer | 0.472 | 2.41 | 4.8 | 2.20 |
| 3B | no stirrer | 0.124 | 2.54 | 3.6 | 1.87 |
| 3C | 380 rpm | 0.124 | 2.14 | 3.9 | 1.91 |
| 4B | no stirrer | 0.248 | 2.29 | 5.3 | 1.87 |

The b and d values with the corresponding $R^2$ values as well as the friability values of Examples 2A to 4B are listed in Table 5 below. The reduction of friability was calculated for the inventive Examples compared to the corresponding comparative Examples (based on the same gas flow): 1A-2B, 3A-3B/C and 4A-4B.

TABLE 5 friability values of the prepared PCCs of the comparative Examples 2A, 3A and 4A and the inventive Examples 2B, 3B, 3C and 4B

| Example | b | $R^2$ of line fit for b | d | $R^2$ of line fit for d | b · d (absolute) | b · d (percentage) | reduction of friability |
|---|---|---|---|---|---|---|---|
| 2A | 0.1531 | 0.97 | 27.7858 | 1.00 | 4.25 | 100 | — |
| 2B | 0.1442 | 0.98 | 27.881 | 1.00 | 4.02 | 94.59 | 5.41 |
| 3A | 0.1578 | 0.99 | 27.5009 | 0.99 | 4.34 | 100 | — |
| 3B | 0.1539 | 0.99 | 27.5203 | 0.99 | 4.24 | 97.70 | 2.30 |
| 3C | 0.1491 | 0.99 | 28.1430 | 0.99 | 4.20 | 96.77 | 3.23 |
| 4A | 0.1529 | 0.99 | 26.3756 | 1.00 | 4.03 | 100 | — |
| 4B | 0.1006 | 0.98 | 26.3010 | 0.99 | 2.65 | 65.76 | 34.24 |

As can be seen from Table 5 the inventive Examples have friability values that are at least 2% lower than the friability value of precipitated calcium carbonate that has been obtained by a similar process, wherein the carbonation is carried out without a static gas bubble comminution unit that is located in the milk of lime. Therefore, it has been shown that by the inventive process according to the present invention precipitated calcium carbonate can be obtained that is more resistant, especially more resistant to compression.

Example 3

Inventive Example 5A

A milk of lime was prepared by mixing under mechanical stirring 5.00 kg water with 1.334 kg calcium oxide obtained from France at an initial temperature of 40° C. The obtained mixture was stirred for 30 min, wherein additional 3.73 kg water was added. Subsequently, the mixture was sieved through a 100 μm screen.

The obtained milk of lime was heated to 50° C. and added to a reactor pipe with a diameter of 100 mm. The reactor pipe contained a static gas bubble comminution unit in the form of a gas permeable iron chromium foam obtained from American Elements, US. Iron chromium foams are metal foams with a high porosity wherein typically 75 to 95% of the volume consist of void spaces. The milk of lime was carbonated in the presence of the static gas bubble comminution unit that was located in the milk of lime by introducing flue gas comprising 20 vol.-% $CO_2$ at a rate listed in Table 6 for 2 hours. The reaction was monitored by online pH and conductivity measurements.

The precipitated calcium carbonate was obtained by filtering the suspension and rinsing the residue with water and drying the obtained precipitated calcium carbonate in an oven at 100° C. The dried precipitated calcium carbonate was shaken through a 1 mm mesh sieve to reduce larger agglomerates. The purity of the obtained precipitated calcium carbonate was controlled by X-ray diffraction using the method described above.

The reaction parameters and characteristics of the prepared PCCs are listed in Table 6 below.

TABLE 6 reaction parameters and characteristics of the prepared PCCs of the inventive Example 5A

| Ex. | kg gas/h per kg dry Ca(OH)$_2$ | kg CO$_2$/h per kg dry Ca(OH)$_2$ | weight median particle size d$_{50}$ μm | BET/ m$^2$ · g$^{-1}$ | steepness d$_{75}$/d$_{25}$ |
|---|---|---|---|---|---|
| 5A | 1.65 | 0.33 | 2.1 | 9.0 | 1.7 |

Example 4

Inventive Examples 6A and 6B

A milk of lime was prepared by mixing under mechanical stirring 5.00 kg water with approximately 1.00 kg calcium oxide obtained from Austria at an initial temperature of 40° C. The contained 0.1 wt.-% (active/on dry calcium oxide) sodium citrate. The obtained mixture was stirred for 30 min, wherein additional 4.00 kg water was added. Subsequently, the mixture was sieved through a 200 μm screen.

4 litre of the obtained milk of lime were heated to 50° C. and added to a 10 litre plastic bucket. A static gas bubble comminution unit in the form of a gas permeable plastic porous material was used. The gas permeable plastic porous material was a Microdyn® tube (type VA/2, polypropylene, 0.2 μm pore width, inner diameter=5 mm, max pressure ~30 bar) from the company Microdyn-Nadir. The milk of lime was carbonated in the presence of the static gas bubble comminution unit that was located in the milk of lime by introducing flue gas comprising vol.-% $CO_2$ for 3 hours for Example 6 A and by introducing 100 vol.-% $CO_2$ for 30 minutes for Example 6B. The reactions was monitored by online pH, temperature and conductivity measurements.

The precipitated calcium carbonate was obtained by filtering the suspension and rinsing the residue with water and drying the obtained precipitated calcium carbonate in an oven at 100° C.

The characteristics of the prepared PCCs are listed in Table 7 below.

TABLE 7 characteristics of the prepared PCCs of the inventive Examples 6A and 6B

| Ex. | weight median particle size $d_{50}$ μm | BET/$m^2 \cdot g^{-1}$ | steepness $d_{75}/d_{25}$ |
|---|---|---|---|
| 6A | 2.76 | 7.2 | 2.6 |
| 6B | 2.39 | 5.2 | 2.0 |

Example 5

Comparative Example 7A and Inventive Examples 7B and 7C

A milk of lime was prepared by mixing under mechanical stirring water with calcium oxide obtained from USA at an initial temperature of 28° C. The obtained mixture was stirred for 30 min. Subsequently, the mixture was sieved through a 325 μm screen.

All of the obtained milk of lime was transferred into a stainless steel reactor and adjusted to the temperature indicated in Table 8 below. The stainless steel reactor contained no static gas bubble comminution unit (comparative Example 7A), a static gas bubble comminution unit in the form of one gas permeable perforated plate (inventive Example 7B) and a static gas bubble comminution unit in the form of two gas permeable perforated plates (inventive Example 7C). In addition the stainless steel reactors further contained a propeller stirrer, however, the stirrer was turned off. The milk of lime was carbonated in the absence of the static gas bubble comminution unit (Example 7A) or in the presence of the static gas bubble comminution unit that was located in the milk of lime (Examples 7B and 7C) by introducing flue gas comprising 20 vol.-% $CO_2$ at a rate listed in Table 8. The gas was flushed around and through the static gas bubble comminution unit. The reaction was monitored by online pH and conductivity measurements.

The precipitated calcium carbonate was obtained by filtering the suspension and rinsing the residue with water and drying the obtained precipitated calcium carbonate in an oven at 100° C.

The amount of the compounds used in the reaction as well as the reaction conditions are listed in Table 8 below.

TABLE 8

Amount of the compounds used in the reaction as well as the reaction conditions for preparation of Examples 7A, 7B and 7C

| | Milk of lime preparation | | | Carbonation reaction | | |
|---|---|---|---|---|---|---|
| Ex. | Amount of water (tonnes) | Amount of CaO (tonnes) | Initial temperature [° C.] | Temp. milk of lime was adjusted to [° C.] | kg gas per kg dry $Ca(OH)_2$ | kg $CO_2$ per kg dry $Ca(OH)_2$ |
| 7A | 33.2 | 7.8 | 28 | 36 | 1.85 | 0.46 |
| 7B | 33.0 | 7.3 | 28 | 35 | 1.98 | 0.49 |
| 7C | 33.1 | 7.5 | 28 | 35 | 1.93 | 0.49 |

The characteristics of the prepared PCCs are listed in Table 9 below.

TABLE 9 characteristics of the prepared PCCs of Examples 7A, 7B and 7C

| Ex. | weight median particle size $d_{50}$ μm | BET/$m^2 \cdot g^{-1}$ | steepness $d_{75}/d_{25}$ |
|---|---|---|---|
| 7A | 1.51 | 8.4 | 1.76 |
| 7B | 1.34 | 9.0 | 1.75 |
| 7C | 1.44 | 8.5 | 1.77 |

The b and d values with the corresponding $R^2$ values as well as the friability values of Example 4 (Inventive Examples 6A and 6B) as well as of Example 5 (Comparative Example 7A and Inventive Examples 7B and 7C) are listed in Table 10 below.

TABLE 10 friability values of the prepared PCCs of comparative Example 7A, and the inventive Examples 6A, 6B, 7B and 7C

| Example | b | $R^2$ of line fit for b | d | $R^2$ of line fit for d | b · d (absolute) |
|---|---|---|---|---|---|
| 7A | 0.0948 | 0.98 | 30.1307 | 1.00 | 2.86 |
| 6A | 0.1407 | 1.00 | 28.1118 | 1.00 | 3.96 |
| 6B | 0.1508 | 0.97 | 30.5407 | 0.99 | 4.61 |
| 7B | 0.0932 | 0.93 | 31.0234 | 0.99 | 2.89 |
| 7C | 0.0856 | 0.99 | 29.9025 | 1.00 | 2.56 |

The invention claimed is:

1. A process for producing precipitated calcium carbonate comprising the steps of:
    a) providing a calcium oxide containing material,
    b) providing an aqueous solution,
    c) providing a gas comprising carbon dioxide,
    d) preparing a milk of lime comprising $Ca(OH)_2$ by mixing the aqueous solution of step b) with the calcium oxide containing material of step a),
    e) carbonating the milk of lime obtained from step d) with the gas of step c) to form an aqueous suspension of precipitated calcium carbonate, wherein:
    the carbonation is carried out in the presence of a static gas bubble comminution unit that is located in the milk of lime and the gas of step c) is flushed around and/or through the static gas bubble comminution unit.

2. The process of claim 1, wherein the gas of step c) further comprises at least one gas other than carbon dioxide and the gas of step c) is introduced at a rate of 0.06 to 5.00 kg gas/h per kg of dry $Ca(OH)_2$ with the proviso that the carbon dioxide is introduced at a rate of 0.05 to 3.50 kg $CO_2$/h per kg of dry $Ca(OH)_2$.

3. The process of claim 1, wherein the aqueous solution of step b) consists of water.

4. The process of claim 1, wherein the aqueous solution of step b) comprises one or more further additives selected from the group consisting of water soluble polymers, calcium carbonate nanoparticles, water-soluble calcium salts, and slaking additives.

5. The process of claim 1, wherein the calcium oxide containing material of step a) and the aqueous solution of step b) are mixed in a mass ratio from 1:1 to 1:15.

6. The process of claim 1, wherein the calcium oxide containing material of step a) and the aqueous solution of step b) are mixed in a mass ratio from 1:4 to 1:12.

7. The process of claim 1, wherein the gas of step c) comprises between 4 and 99 vol.-% carbon dioxide, based on the total volume of the gas.

8. The process of claim 1, wherein the gas of step c) comprises between 6 and 40 vol.-% carbon dioxide, based on the total volume of the gas.

9. The process of claim 1, wherein the gas of step c) comprises between 8 and 25 vol.-% carbon dioxide, based on the total volume of the gas.

10. The process of claim 1, wherein the gas in step e) is introduced at a rate of 0.06 to 5.00 kg gas/h per kg of dry $Ca(OH)_2$, and/or the carbon dioxide is introduced at a rate of 0.05 to 3.50 kg $CO_2$/h per kg of dry $Ca(OH)_2$.

11. The process of claim 1, wherein the gas in step e) is introduced at a rate of 0.09 to 4.00 kg gas/h per kg of dry $Ca(OH)_2$, and/or the carbon dioxide is introduced at a rate of 0.07 to 2.00 kg $CO_2$/h per kg of dry $Ca(OH)_2$.

12. The process of claim 1, wherein the gas in step e) is introduced at a rate of 0.12 to 3.00 kg gas/h per kg of dry $Ca(OH)_2$, and/or the carbon dioxide is introduced at a rate of 0.10 to 1.50 kg $CO_2$/h per kg of dry $Ca(OH)_2$.

13. The process of claim 1, wherein the precipitated calcium carbonate obtained in step e) has a specific surface area from 2.0 to 80.0 $m^2/g$, measured using nitrogen and the BET method according to ISO 9277:1995.

14. The process of claim 1, wherein the precipitated calcium carbonate obtained in step e) has a specific surface area from 2.5 to 13.0 $m^2/g$, measured using nitrogen and the BET method according to ISO 9277:1995.

15. The process of claim 1, wherein the precipitated calcium carbonate obtained in step e) is in a form of particles having a weight median particle size $d_{50}$ of between 1.0 and 9.0 µm.

16. The process of claim 1, wherein the precipitated calcium carbonate obtained in step e) is in a form of particles having a weight median particle size $d_{50}$ of 1.2 and 3.7 µm; and wherein the carbonation is carried out in the absence of agitators and stirrers.

17. The process of claim 1, wherein the precipitated calcium carbonate obtained in step e) is in a form of particles having a calcitic crystal form.

18. The process of claim 1, wherein the milk of lime is stirred during step e).

19. The process of claim 1, further comprising the steps of:
f) separating the precipitated calcium carbonate from the aqueous suspension obtained from step e), and optionally
g) drying the separated precipitated calcium carbonate obtained from step f).

20. The process of claim 19, wherein step g) takes place.

21. The process of claim 20, which further comprises a step h) of contacting at least a part of the surface of the precipitated calcium carbonate obtained from step g) with a surface-treatment agent.

* * * * *